Figure 2:
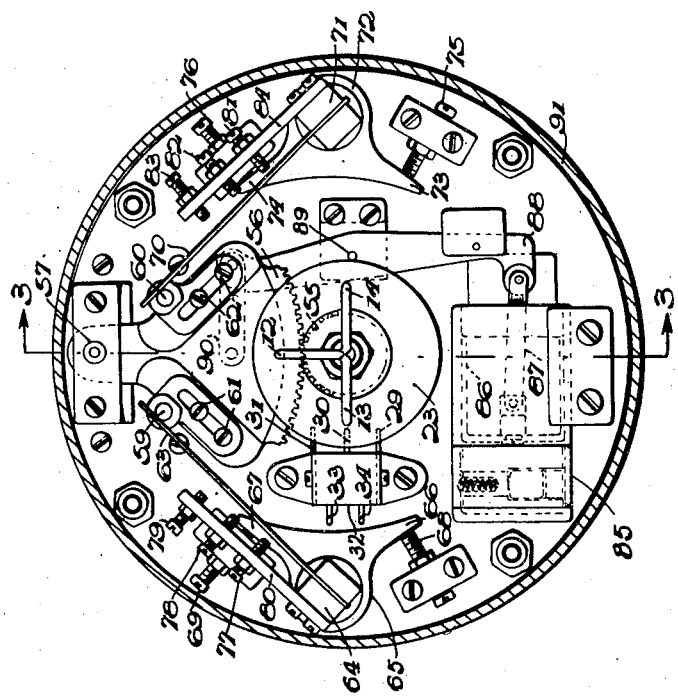

June 20, 1944.  P. A. NOXON  2,351,629
RATE OF TURN METER
Filed April 17, 1942  2 Sheets-Sheet 1

Inventor
Paul A. Noxon
By Stephen Cerstvik.
Attorney

June 20, 1944.  P. A. NOXON  2,351,629
RATE OF TURN METER
Filed April 17, 1942  2 Sheets-Sheet 2

Inventor
Paul A. Noxon
Stephen Cerstvik
By
Attorneys

Patented June 20, 1944

2,351,629

UNITED STATES PATENT OFFICE 2,351,629

RATE-OF-TURN METER

Paul A. Noxon, Tenafly, N. J., assignor to Bendix Aviation Corporation, Bendix, N. J., a corporation of Delaware Application April 17, 1942, Serial No. 439,426

8 Claims. (Cl. 33—204)

The present invention relates to a rate of turn responsive device and/or indicator for aircraft and the like, for measuring and/or indicating the rate of turn of the craft, and is an improved modification and continuation in part of the invention disclosed in co-pending application Serial No. 439,425, filed of even date herewith.

One of the objects of the present invention is to provide a novel gyroscopic rate of turn responsive device and/or indicator of the same general type disclosed in the aforesaid co-pending application Serial No. 439,425 which includes, among other elements, a two-degree-of-freedom gyroscope mounted for precession in response to a turn of the craft on which the device is mounted, and means yieldingly opposing the precession as a function of the tangent of the angle through which the gyroscope precesses, so that said angle of precession is equal to the angle at which the craft is banked during the turn, whereby the rate of turn of the craft is more accurately measured than has been possible heretofore.

The improved and novel features, however, which distinguish the present invention from that disclosed in the aforesaid application Serial No. 439,425 are that the gyroscope is electrically driven in the present case instead of by air, and a simple cantilever or leaf spring is provided instead of a pair of flat coil springs for opposing the precession of the gyroscope as a function of the tangent of the angle through which the gyroscope precesses. Also various adjustments are provided in the structure of the present invention whereby the accuracy of the instrument is still further improved over that of the instrument disclosed in the aforesaid co-pending application.

Accordingly, another object of the invention is to provide a novel gyroscopic rate of turn responsive device for aircraft and the like, the structure of which is relatively simpler and easier to manufacture and assemble and adjust or calibrate in mass production than that disclosed in the aforesaid co-pending application.

Still another object is to provide in an instrument of the class described an electrically driven gyroscope embodying a novel and improved structure for feeding the required electrical energy to the gyro rotor which is, per se, a two-phase induction motor.

Still another object of the invention is to provide a gyroscopic rate of turn responsive device and/or indicator embodying novel means for adjusting the zero position of the instrument and for adjusting the calibration of the instrument through a desired range.

The above and other objects and advantages of the invention will appear more fully hereinafter from a consideration of the detailed description which follows, taken together with the accompanying drawings wherein one embodiment of the invention is illustrated. It is to be expressly understood, however, that the drawings are for purposes of illustration only and are not to be construed as defining the limits of the invention, reference being had for this purpose to the appended claims.

Figure 1:
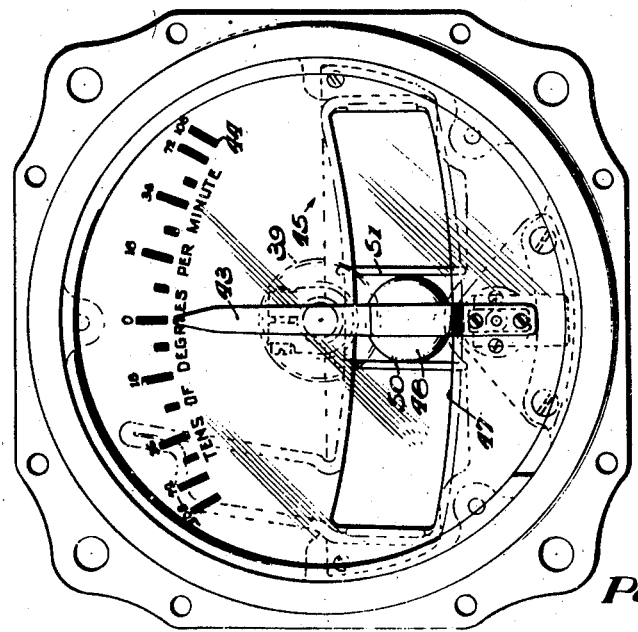
Figure 3:
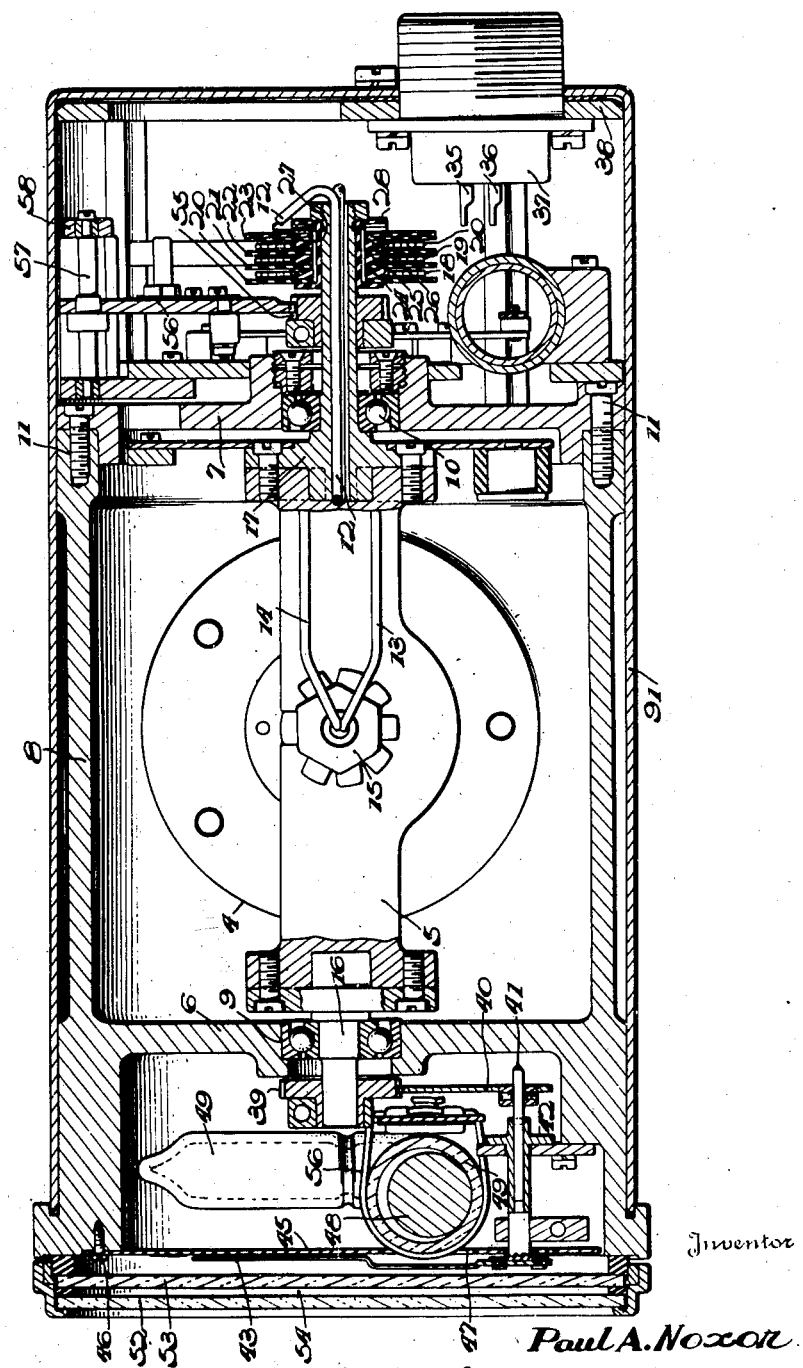

In the drawings, wherein like characters refer to like parts throughout the several views, Fig. 1 is a front elevation of the instrument;

Fig. 2 is a rear view, also in elevation, of the instrument with the rear wall of the housing removed, the housing being shown in section; and Fig. 3 is a longitudinal section of the instrument taken on line 3—3 of Fig. 2.

Referring now to the drawings and more particularly to Fig. 3, one form of the instrument embodying the invention is shown as comprising a gyroscope having a rotor 4 journalled in a horizontal gimbal frame 5 pivotally mounted in a front wall 6 and a rear wall 7 of a two-part cylindrical housing 8 by means of ball bearings 9 and 10, respectively. The rear wall 7 is in the form of a closure plate attached to the rear of the cylindrical housing 8 in any suitable manner as by means of screws 11 to facilitate mounting of the gyroscope.

The rotor 4 of the gyroscope is, per se, in the form of a two-phase induction motor and is energized by an alternating current from any suitable source (not shown) by means of leads 12, 13 and 14 which enter the rotor 4 through one of its bearings 15 provided on one side of the gimbal frame 5, there being a similar bearing for the rotor on the opposite side of said gimbal frame 5 but which is not seen in the drawings.

The forward end of the gimbal frame 5, as viewed in Fig. 3, is provided with a stub shaft 16 which passes through the bearing 9 and carries the inner race thereof. Likewise the rear end of the gimbal frame 5 is provided with a shaft 17 which, however, is hollow and passes through the bearing 10 and carries the inner race thereof. Shaft 17 is hollow in order to permit the passage of the conductors 12, 13 and 14 therethrough from the outer end thereof.

On the end of the shaft 17 there are provided three hair springs 18, 19 and 20 of conducting material surrounding said shaft 17 and spaced from each other along said shaft by means of insulating discs 20, 21, 22 and 23. Each of the hair springs 18, 19 and 20 is wound around a collar 24, 25 and 26 respectively, the inner end of each hair spring passing through its respective collar into a space 27 provided between the collars 24, 25 and 26 and a sleeve 28 on the end of the shaft 17, the said space 27 extending longitudinally of the shaft 17. The ends of said hair springs are made to emerge at the outer face of the insulating disc 23 where they are respectively attached to the ends of the leads 12, 13 and 14 as shown in Figs. 2 and 3. The outer ends of the hair springs 18, 19 and 20 are respectively connected to three terminals 29, 30 and 31 of the secondary of a miniature transformer 32, the primary of which has two terminals 33 and 34 (Fig. 2) which are connected to a pair of terminals 35 and 36 respectively of an electrical receptacle 37 which projects through a rear plate 38 which forms an auxiliary housing with the plate 7.

The forward stub shaft 16 of the gimbal frame 5 is provided at its end with a pinion 39 which meshes with a gear sector 40 attached to one end of a pointer shaft 41 which passes through a fixed sleeve 42 and carries an indicating pointer 43 at its outer end. The pointer 43 cooperates with a scale 44 (Fig. 1) provided on a dial 45 attached to the front end of housing 8 in any suitable manner as by means of screws, one of which is shown at 46. The scale 44 is calibrated in tens of degrees of turn per minute from each side of zero which is centrally located on the scale so that when the pointer moves clockwise as shown in Fig. 1, it will indicate a turn to the right of so many degrees per minute and when it moves counter-clockwise it will show a turn to the left of so many degrees per minute.

The dial 45 is provided with a cut-out portion 47 which serves as a window for viewing a ball 48 which is adapted to roll in a curved glass tube 49 carried by a bracket formed of wires 50 and 51 which also serve as reference indicating means to show when the ball is in central position when the craft on which the instrument is mounted is flying level and is not banked either to the left or to the right. The front face of the instrument is closed by a pair of cover glasses 52, 53 through which the pointer 43 and dial 45 are visible, said cover glasses forming a heat insulating space 54 therebetween, whereby fogging of the cover glasses due to differences in temperature between the inside of the instrument and the outside thereof at high altitudes is prevented.

From the structure thus far described, it will be seen that if the instrument is turned about a vertical axis as viewed in Fig. 3, the gyroscope 4 will precess about a horizontal axis coincident with the shafts 16 and 17 in bearings 9 and 10 in one direction or the other depending upon whether the turn about the vertical axis is to the left or to the right, but such precession would not be a measure of the rate of turn nor would the gyro return to its neutral or zero position after the turn has ceased, and not until an equal turn were made in the opposite direction. In accordance with the present invention, means are now provided whereby the precession of the gyroscope will be a measure of the rate of turning about the vertical axis. In the form shown, said means comprise a pinion 55 attached to shaft 17 and meshing with a sector 56 carried by a shaft 57 journalled in a bracket 58 so that as the gyro precesses, the pinion 55 will actuate the gear sector 56. A pair of pins 59, 60 is adjustably mounted on the gear sector 56 on opposite sides of the center line thereof by means of screws 61 and 62, respectively. Cooperating with and engaging pin 59 is a simple cantilever or leaf spring 63, the opposite end of which is anchored in a block 64 carried by a pivotally mounted member 65 having projecting portions 66 and 67 which abut adjusting screws 68 and 69, respectively, whereby said pivoted member 65 is held rigidly stationary but may be adjusted by means of said screws 68 and 69 about an axis passing through the block 64 at right angles to the plane of the paper as viewed in Fig. 2. A similar cantilever or leaf spring 70 is provided for engaging the pin 60 and the opposite end thereof is likewise anchored in a square block 71 carried by a pivoted member 72 having projecting portions 73 and 74 abutting adjusting screws 75 and 76, respectively, which hold said member 72 in an adjusted position in the same manner as screws 68 and 69 hold pivoted member 65.

It will now be seen that when the gyroscope 4 precesses it will actuate a gear sector 56 through pinion 55 and will cause either pin 59 or pin 60 to move against the force of the spring 63 or the spring 70 depending upon whether the precession is in one direction or another, thereby flexing one or the other of said springs, and when the precession has stopped due to the fact that turning of the instrument about a vertical axis has stopped, said springs 63 and 70 act to return the gyroscope to neutral or zero position i. e. said springs function to centralize the gyroscope. The springs 63 and 70, however, also produce a yielding opposing force or torque which opposes the precession of the gyroscope, whereby said precession becomes a function of the rate of turn about the vertical axis, and thus the pointer 43 would indicate the rate of turn on the scale 44 of dial 45. The indication of the pointer 43, however, would not be a true indication of the exact rate of turn and, therefore, in accordance with the invention, means are provided for imparting to said springs 63 and 70 the characteristic of producing an opposing force for opposing the precession of the gyroscope as a function of the tangent of the angle through which said gyroscope precesses so that the angle of precession becomes equal to the angle at which the aircraft carrying the instrument is banked while turning, thereby making the angle of precession of the gyroscope a true measure of the rate of turn of the craft, so that pointer 43 will indicate true rate of turn of the craft while banked. As illustrated, said means comprise a set of curb or stop screws for each of said springs 63 and 70. Curb or stop screws for the spring 63 are shown at 77, 78 and 79 which are carried by an arm 80 attached to the block 64 in parallel relation to the spring 63. The screws 77, 78 and 79 are so arranged that screw 77 is nearest the spring 63 while screw 78 is a little further away from the spring and screw 79 is the farthest away therefrom. Thus, when pin 59 pushes against the spring 63, the latter will first strike the end of the screw 77 and then the end of screw 78 and finally the end of screw 79.

The relative distances of the ends of said screws from the spring 63 are such that the opposing force of the spring is a function of the tangent of the angle through which the gyroscope precesses. A similar set of screws 81, 82 and 83 is provided for cooperation with the spring 70 and they are carried by an arm 84 attached to the block 71 in parallel relation with said spring 70.

Means are also provided for damping the action of the gyroscope through the gear 55 and gear sector 56 and, in the form shown, said damping means comprise a dashpot cylinder 85 having a piston 86 movable therein, said piston being pivotally connected by means of a piston rod 87 to one end of a lever 88 which is pivoted at 89. The other end of said lever 88 is pivotally connected to the gear sector 56 by means of a link 90.

The entire instrument is enclosed within a housing 91 which is adapted to be slid over the housing 8 from the rear thereof toward the front of the instrument as shown in Fig. 3.

If the opposing torque produced by the springs 63 or 70 were plotted against the angle of precession of the gyroscope, but without the use of the curb screws, the resulting graph would be substantially a straight line. Then, by providing the curb screws and adjusting them properly the straight line will become a curve represented by the equation $y = \tan x$, $y$ being the opposing torque produced by the springs and $x$ being the angle of deflection. By the adjustment provided by the pivoted members 65 and 72, respectively, the zero point of the curve may be shifted to any desired point required for proper calibration of the pointer 43 against the zero point of the scale 44. Likewise, by the adjustment provided for the pins 59 and 60 by means of screws 61 and 62, the slope of the curve may be changed for proper calibration of the instrument through any desired range.

In view of the fact that the opposing force produced by the springs 63 and 70 is made to be a function of the tangent of the angle of precession of the gyroscope, this angle becomes equal to the angle at which the craft is banked during turning and, therefore, becomes a true measure of the rate of turn.

There is thus provided a novel rate of turn responsive device and/or indicator for aircraft and the like, which is more accurate than gyroscopic rate of turn indicators known heretofore and one which can be easily and readily adjusted for calibration purposes to increase its accuracy even to a greater extent.

Although only one embodiment of the invention has been illustrated and described, various changes and modifications in the form and relative arrangement of the parts, which will now appear to those skilled in the art, may be made without departing from the spirit or the scope of the invention. Reference is therefore to be had to the appended claims for a definition of the limits of the invention.

What is claimed is:

1. In a rate of turn responsive device for an aircraft which banks on turning, a part adapted to be fixed on said craft, a gyroscope mounted on said part for precession about an axis at an angle to the vertical in response to turning of said craft, said gyroscope having a precession frame and a rotor mounted therein for spinning about an axis at an angle to said precession axis and to the vertical, means comprising a cantilever or leaf spring having one end fixed and its other end free, means actuated by said precession frame and adapted to move the free end of said leaf spring to flex the latter upon precession of said gyroscope to yieldingly oppose said precession, whereby the angle through which said gyroscope precesses becomes a function of the rate of turn of said craft, means acting on said leaf spring to impart thereto the characteristic of opposing the precession of said gyroscope as a function of the tangent of the angle of precession, whereby said angle becomes equal to the angle at which said craft is banked while turning and is a true measure of the rate of turn of said craft at that angle of bank, and means actuated by said gyroscope in accordance with said rate of turn.

2. In a rate of turn responsive device for an aircraft which banks on turning, a part adapted to be fixed on said craft, a gyroscope mounted on said part for precession about an axis at an angle to the vertical in response to turning of said craft, said gyroscope having a precession frame and a rotor mounted therein for spinning about an axis at an angle to said precession axis and to said vertical, a cantilever or leaf spring located at each side of said precession axis, each of said springs having one end fixed and its other end free, means actuated by said precession frame and adapted to move the free end of one or the other of said springs to flex one or the other upon precession of said gyroscope in one direction or the other to yieldingly oppose said precession, whereby the angle through which said glyroscope precesses becomes a function of the rate of turn of said craft, means acting on each of said springs along the respective lengths thereof to impart thereto the characteristic of opposing the precession of said gyroscope as a function of the tangent of the angle of precession, whereby said angle becomes equal to the angle at which said craft is banked while turning and is a true measure of the rate of turn of said craft at that angle of bank, and means actuated by said gyroscope in accordance with said rate of turn.

3. In a rate of turn responsive device for an aircraft which banks on turning, a part adapted to be fixed on said craft, a gyroscope mounted on said part for precession about an axis at an angle to the vertical in response to turning of said craft, said gyroscope having a precession frame and a rotor mounted therein for spinning about an axis at an angle to said precession axis and to said vertical, a cantilever or leaf spring located at each side of said precession axis, each of said springs having one end adjustably fixed and its other end free, means actuated by said precession frame and adapted to move the free end of one or the other of said springs to flex one or the other upon precession of said gyroscope in one direction or the other to yieldingly oppose said precession, whereby the angle through which said gyroscope precesses becomes a function of the rate of turn of said craft, means acting on each of said springs along the respective lengths thereof to impart thereto the characteristic of opposing the precession of said gyroscope as a function of the tangent of the angle of precession, whereby said angle becomes equal to the angle at which said craft is banked while turning and is a true measure of the rate of turn of said craft at that angle of bank, means for bodily adjusting said springs about their respectively fixed ends to establish the zero of the device, and means actuated by said gyroscope in accordance with said rate of turn.

4. In a rate of turn meter for an aircraft which banks on turning, a part adapted to be fixed on said craft, a gyroscope mounted on said part for precession at an angle to the vertical in response to turning of said craft, said gyroscope having a precession frame and a rotor mounted therein for spinning about an axis at an angle to said precession axis and to said vertical, a cantilever or leaf spring located at each side of said precession axis, each of said springs having one end adjustably fixed and its other end free, means actuated by said precession frame and adapted to move the free end of one or the other of said springs to flex one or the other upon precession of said gyroscope in one direction or the other to yieldingly oppose said precession, whereby the angle through which said gyroscope precesses becomes a function of the rate of turn of said craft, means acting on each of said springs along the respective lengths thereof to impart thereto the characteristic of opposing the precession of said gyroscope as a function of the tangent of the angle of precession, whereby said angle becomes equal to the angle at which said craft is banked while turning, and is a true measure of the rate of turn of said craft at that angle of bank, means for bodily adjusting said springs about their respective fixed ends to adjust the zero of the meter, and indicating means actuated by said gyroscope in accordance with said rate of turn.

5. In a rate of turn responsive device for an aircraft which banks on turning, a part adapted to be fixed on said craft, a gyroscope mounted on said part for precession about an axis at an angle to the vertical in response to turning of said craft, said gyroscope having a precession frame and a rotor mounted therein for spinning about an axis at an angle to said precession axis and to said vertical, a cantilever or leaf spring located at each side of said precession axis, each of said springs having one end adjustably fixed and its other end free, means including a gear sector actuated by said precession frame about an axis parallel to said precession axis, a pair of pins adjustably mounted on said gear sector, one of said pins being located at one side of said precession axis and adapted to engage the free end of one of said springs and the other of said pins being at the other side of said precession axis and adapted to engage the free end of the other of said springs so that one or the other of said pins is adapted to move the free end of its associated spring to flex the latter upon precession of said gyroscope to yieldingly oppose said precession, whereby the angle through which said gyroscope precesses becomes a function of the rate of turn of said craft, adjustable means acting on each of said springs along the respective lengths thereof to impart thereto the characteristic of opposing the precession of said gyroscope as a function of the tangent of the angle of precession, whereby said angle becomes equal to the angle at which said craft is banked while turning and is a true measure of the rate of turn of said craft at that angle of bank, means for bodily adjusting said springs about their free ends to adjust the zero of said device, and means actuated by said gyroscope in accordance with said rate of turn.

6. In a rate of turn meter for an aircraft which banks on turning, a part adapted to be fixed on said craft, a gyroscope mounted on said part for precession about an axis at an angle to the vertical in response to turning of said craft, said gyroscope having a precession frame and a rotor mounted therein for spinning about an axis at an angle to said precession axis and to said vertical, a cantilever or leaf spring located at each side of said precession axis, each of said springs having one end adjustably fixed and its other end free, means including a gear sector actuated by said precession frame about an axis parallel to said precession axis, a pair of pins adjustably mounted on said gear sector, one of said pins being located at one side of said precession axis and adapted to engage the free end of one of said springs and the other of said pins being at the other side of said precession axis and adapted to engage the free end of the other of said springs so that one or the other of said pins is adapted to move the free end of its associated spring to flex the latter upon precession of said gyroscope to yieldingly oppose said precession, whereby the angle through which said gyroscope precesses becomes a function of the rate of turn of said craft, adjustable means acting on each of said springs along the respective lengths thereof to impart thereto the characteristic of opposing the precession of said gyroscope as a function of the tangent of the angle of precession, whereby said angle becomes equal to the angle at which said craft is banked while turning and is a true measure of the rate of turn of said craft at that angle of bank, means for bodily adjusting said springs about their free ends to adjust the zero of said device, and indicating means actuated by said gyroscope in accordance with said rate of turn.

7. In a rate of turn responsive device for an aircraft which banks on turning, a part adapted to be fixed on said craft, a gyroscope mounted on said part for precession in response to turning of said craft about one of its axes, said gyroscope having a precession frame and a rotor mounted therein for spinning about an axis at an angle to its axis of precession and to the axis of said craft about which said craft turns, means comprising a leaf spring having one end attached to the part fixed to the craft and its other end arranged to be actuated by the precession frame upon precession of said gyroscope to flex said spring for yieldingly opposing said precession, whereby the angle of precession of said gyroscope becomes a function of the rate of turn of said craft, and means acting on said leaf spring to impart thereto the characteristic of opposing the precession of said gyroscope as a function of the tangent of said angle of precession, whereby said angle of precession becomes a true measure of the rate of turn of said craft.

8. A two-degree-of-freedom rate-responsive gyroscope for aircraft, means mounting said gyroscope for precession in response to turning of said craft about one of its axes, a leaf spring opposing the precession of said gyroscope to centralize the latter about its axis of precession, and means acting on said spring to cause it to apply a force to said mounting means opposing said precession, said force being proportional to the tangent of the angle of precession, whereby said angle becomes a true measure of the rate of turn of said craft.

PAUL A. NOXON.